Oct. 7, 1941.　　　C. KLUMB　　　2,258,387
CUTTING IMPLEMENT
Filed April 7, 1939　　　2 Sheets-Sheet 1

Inventor
Clarence Klumb.
By ⟨signature⟩
Attorney

Oct. 7, 1941.  C. KLUMB  2,258,387
CUTTING IMPLEMENT
Filed April 7, 1939  2 Sheets-Sheet 2
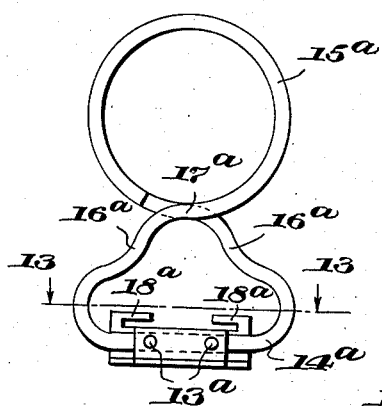
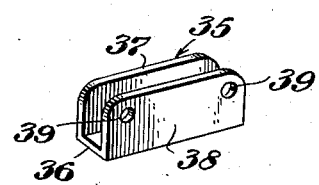
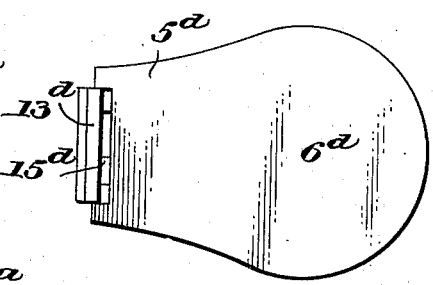
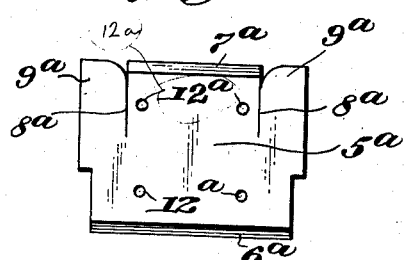
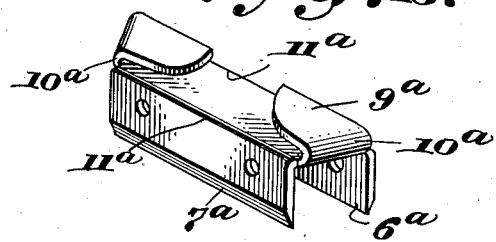
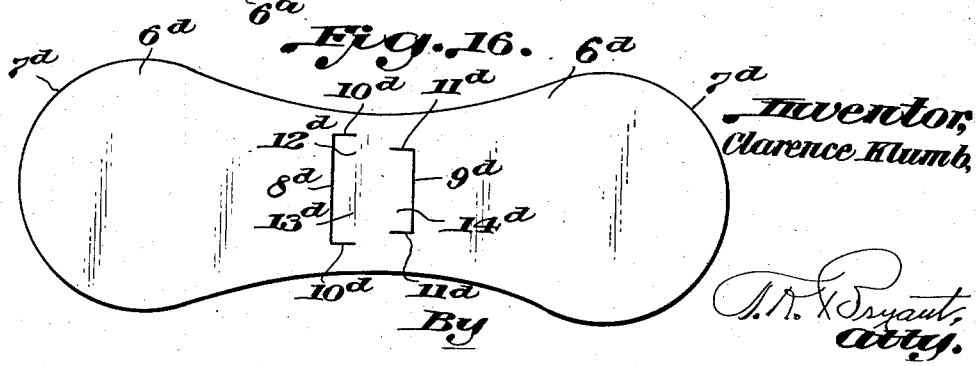

Patented Oct. 7, 1941

2,258,387

UNITED STATES PATENT OFFICE 2,258,387

CUTTING IMPLEMENT

Clarence Klumb, Milwaukee, Wis.

Application April 7, 1939, Serial No. 266,620

5 Claims. (Cl. 30—305)

This invention relates to improvements in cutting implements and more particularly to cutting implements adapted to be employed for producing incisions in the leaves of picture albums.

The primary object of this invention is to provide a cutting implement of the above mentioned character capable of forming a pair of parallel incisions of different lengths in a picture album for receiving the corner portions of postal cards or pictures.

A still further object of this invention is to provide a cutting device of the above mentioned character including parallel cutting blades, one of which extends slightly beyond the edge of the other, whereby said cutting blades may form corresponding shaped slots by merely placing the device in the desired position and exerting pressure on the handle with the palm of the hand.

A still further object of the invention is to provide a cutting implement of the above mentioned character which may be formed by producing the cutter elements from a single blank of material, preferably high grade steel by stamping operations and providing means on the stamping for accommodating a handle.

A still further object of the invention resides in the cheapness with which the device may be constructed, producing a cutting implement having comparatively few parts to become out of order and one which is extremely simple to operate.

Other objects and advantages of the invention will become apparent during the course of the following description, taken with the drawings, wherein:

Figure 7 is a plan view of a section of an album leaf illustrating the incisions formed therein produced by the cutting implement for receiving the corners of photographs or the like;

Figure 12 is a modified form of the invention shown in top plan, illustrating a cutter having parallel blades supported by a wire handle;

Figure 13 is a horizontal cross sectional view taken on line 13—13 of Figure 12, looking in the direction of the arrows;

Figure 14 is a plan view of the blank from which the cutting blades are formed, shown in Figures 12 and 13;

Figure 15 is a perspective view of the cutter illustrating a pair of guide members carried thereby for determining the distance or location of the incisions that are to be made in the album leaf;

Figure 16 is a still further modified form of the invention showing a plan view of a cutter blank in which the cutting blades are stamped from a sheet of metal, also forming the handles thereof;

Figure 17 is a side elevational view of the cutter formed from the blank shown in Figure 16, and Figure 18 is a perspective view of a guard member capable of being positioned over the cutting blades when the cutting implement is not in use.

Figure 1:
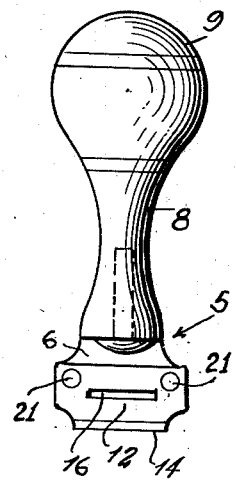
Figure 1 is a side elevational view of the device embodying this invention.
Figure 2:
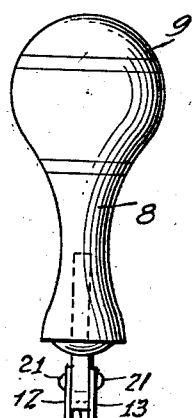
Figure 2 is an end elevational view illustrating the arrangement of the parallel blades.
Figure 3:
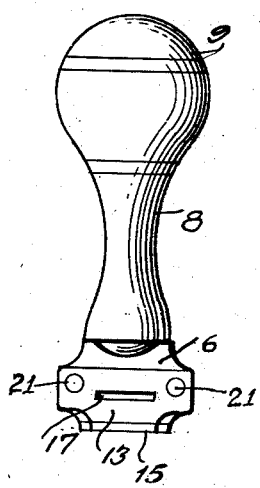
Figure 3 is a side elevational view illustrating the reverse side to that shown in Figure 1, showing the reduced length of one of the parallel blades.
Figure 4:
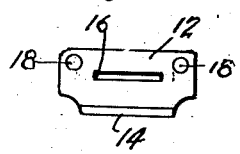
Figure 4 is a plan view of one of the cutting blades illustrating the same detached from the holder.
Figure 5:
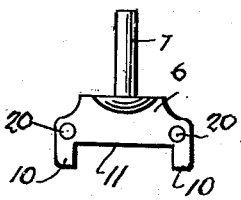
Figure 5 is a plan view of the holder showing the same detatched from the handle and the blades removed.
Figure 6:
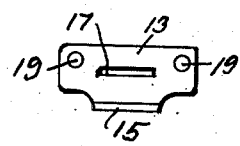
Figure 6 is a top plan view of the other cutting blade illustrating the smaller cutting edge of the two cutting blades.
Figure 7:
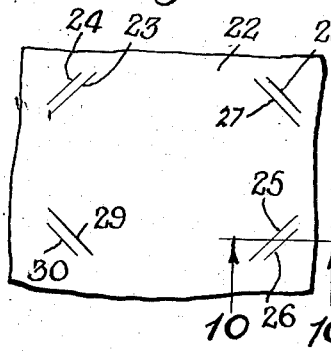

In the drawings, and particularly Figures 1 to 6 inclusive, wherein for the purpose of illustrating the main embodiment of the invention and wherein like reference characters will be employed to designate like parts throughout the same, the reference character 5 will generally be employed to designate a cutting implement including a shank portion 6 to which is attached a stem 7 for receiving a handle 8. The upper portion of the handle as at 9 is bulb shaped providing a round or curved surface for engagement by the user's hand while exerting downward pressure on the cutting device. The shank 6 is provided at its opposite ends with extensions 10 producing a cut-away portion 11 intermediate the extensions.

Attached to the shank 6 are parallel cutting blades 12 and 13 having cutting edges 14 and 15 respectively. It will be noted that the cutting edge 14 is slightly longer than the cutting edge 15 and extends beyond the edges thereof as clearly shown in Figure 3. Each blade is slotted as at 16 and 17 and the slots 16 and 17 correspond in length to the cutting edges 14 and 15. Said slots 16 and 17 are adapted to receive the corner portion of a photograph so that the cutting blades 14 and 15 may be positioned in the exact location for producing incisions in the album leaf.

Suitable means may be provided for attaching the blades 12 and 13 to the holding shank 6 and it will be noted that the corners of each blade 12 and 13 are provided with openings 18 and 19 respectively which may receive a rivet or other fastening element 21 extending through correspondingly positioned openings 20 formed in the blade holding shank 6.

It is to be noted that the cut-away portion 11 coincides with the slots 16 and 17 so that there will be no obstructions to the corner portions of a photograph when inserted through the openings 16 and 17.

Figure 8:
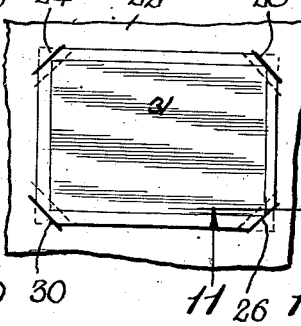
Figure 8 is a plan view of an album leaf in which has been made incisions by the cutter, illustrating the manner in which a photograph may have its corners inserted therein.
Figure 9:
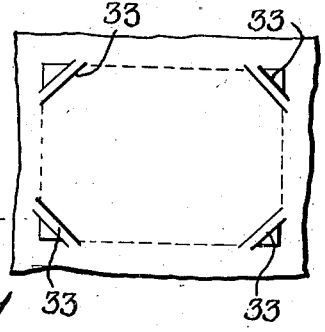
Figure 9 is a plan view further illustrating an album leaf illustrating the reverse side thereof and showing the manner in which the photograph may be inserted so that both sides of the album leaf may receive the corners of a photograph.
Figure 10:
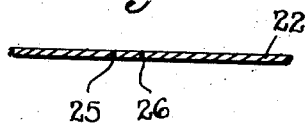
Figure 10 is a horizontal cross-sectional view taken on line 10—10 of Figure 7, looking in the direction of the arrows through the incision area.
Figure 11:
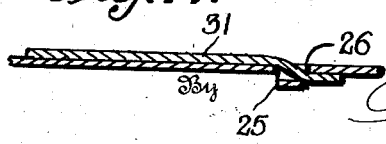
Figure 11 is a horizontal cross-sectional view taken on line 11—11 of Figure 8, looking in the direction of the arrows, illustrating the manner in which the corners of photographs may be anchored to the album leaf.

When it is desired to mount the photograph on an album leaf or sheet, as shown at 22, the cutting implement is positioned thereon and the corner of the photograph is first inserted through the slot 16 and then the remaining portion is extended through the slot 17. Once the photograph is in the desired position with respect to the album sheet or leaf, downward pressure may be exerted on the cutting implement to cause the cutting blade 14 to form the incision 23 and the opposite or parallel cutting blade 15 to form the incision 24. The cutting implement is then removed and the corner of the photograph is inserted through the incisions 23 and 24. The cutting implement may then be placed upon the opposite corner of the photograph and pressed downwardly to form the incisions 25 and 26. The cutter may then be removed and the corner portion of the photograph may be received in the slots 25 and 26. The diametrically opposite slots 27 to 30 inclusive may be produced in the same manner without removing the photograph from its centered position. As shown in Figures 8 and 9, a photograph 31 may have its corner portions received in only slots 24, 26, 28 and 30 whereby the opposite face of the album sheet will be free for receiving a similarly shaped photograph, the corner portions of which may be slipped under straps 33 formed by the parallel pairs of incisions 23 to 30 inclusive.

Attention is directed to Figures 12 to 15 inclusive wherein a modified form of the invention is shown and includes a cutter blank 5a having opposite cutting edges 6a and 7a. The blank is further formed with parallel slots 8a at opposide ends thereof providing wings 9a adapted to be bent as at 10a to form suitable guide members adapted to receive the corner portion of a photograph. The cutting blades are formed by bending the blank 5a upon lines 11a as shown in Figure 15. Openings 12a may be formed in the blank 5a for receiving rivets or other fastening elements 13a extending through the looped portion 14a of a wire handle 15a. The wire handle is formed by crossing the shank portion 16a as at 17a whereby a circular ring-shaped handle will be provided and may be readily grasped in the palm of the operator's hand for exerting a downward pressure upon the cutting blade.

The cutter described in Figures 12 to 15 inclusive is used in identically the same manner as the cutting instrument shown in Figures 1 to 6 inclusive and the corners of the photograph are received under the wings 9a as at 18a whereby said photograph may be positioned or located with respect to the album leaf prior to the formation of the incision therein.

In Figures 16 and 17, another modification of the invention is shown and includes a blank 5d having oppositely extending wing portions 6d provided with curved edges 7d defining circular end portions. The central portion of the blank 5d is provided with oppositely disposed transversely extending parallel slots 8d and 9d terminating at their ends in oppositely directed angular slots 10d and 11d respectively. It is intended to bend the blank 5d so that the wing portions 6d extend in parallel relation when the blank is bent along lines transversely thereof in alignment with the ends of the oppositely directed angular slots 10d and 11d providing an intermediate base section 12d. When the blank is thus bent, cutting blades 13d and 14d are formed and said blades extend in parallel relation to produce the incisions in an album leaf or sheet as shown in Figures 7 to 11 inclusive. A slot 15d is formed after the blades have been bent as shown in Figure 17 for receiving the corner portions of the photographs to be mounted. The cutting implement shown in Figures 16 and 17 is used in identically the same manner as the other cutting implements in forming the corner incisions in the album leaf or sheet 22.

When the cutting implements shown in Figures 1 to 6 and 12 to 17 are not in use, the cutting edges of the blades may be protected by a guard member shown in Figures 18 as at 35, having a base portion 36 and upwardly extending side walls 37 and 38. The side wall 38 is provided with openings 39 for frictionally engaging the rivets employed in anchoring the blade blank members to the handle carrying shank and thereby prevent the accidental displacement thereof. If desired, the side wall 38 may have punched recesses at the corners producing protuberances extending inwardly for frictionally engaging the blade portion of the cutting implement instead of the opening 39.

It is to be understood that the forms of the invention herewith shown and described may be taken as preferred embodiments of the same, but that various changes in the shape, size and arrangement of parts may be resorted to without departing from the spirit and scope of the invention as claimed.

I claim:

1. In a cutting device of the character described, a blade holder, a pair of spaced parallel cutting blades carried by the holder, there being an area between the vertical planes defined by the two blades with the area opening at opposite sides of the device, the opposite open sides of the area being relatively long and short and the cutting blades being respectively of the same length as the long and short sides of the area whereby a pair of parallel incisions may be made in an album leaf with corresponding ends of the incisions being in a substantially straight line at an angle to a corresponding straight line at the other ends of the incision.

2. A cutting device as set forth in claim 1, wherein the cutting blades are attached to opposite sides of said holder and said side openings of said area are formed in said cutting blades.

3. A cutting device as set forth in claim 1, wherein the cutting blades are integral with said holder and said side openings of said area are formed in said holder.

4. A cutting device as set forth in claim 1, wherein said cutting blades are integral with said holder and angularly bent extensions on said holder providing said side openings of said area.

5. A cutting device as set forth in claim 1, wherein said cutting blades are integral with said holder, a handle formation from which the holder and cutting blades are struck and said side openings of said area being formed by the striking-out of said cutting blades.

CLARENCE KLUMB.